Figure 1:
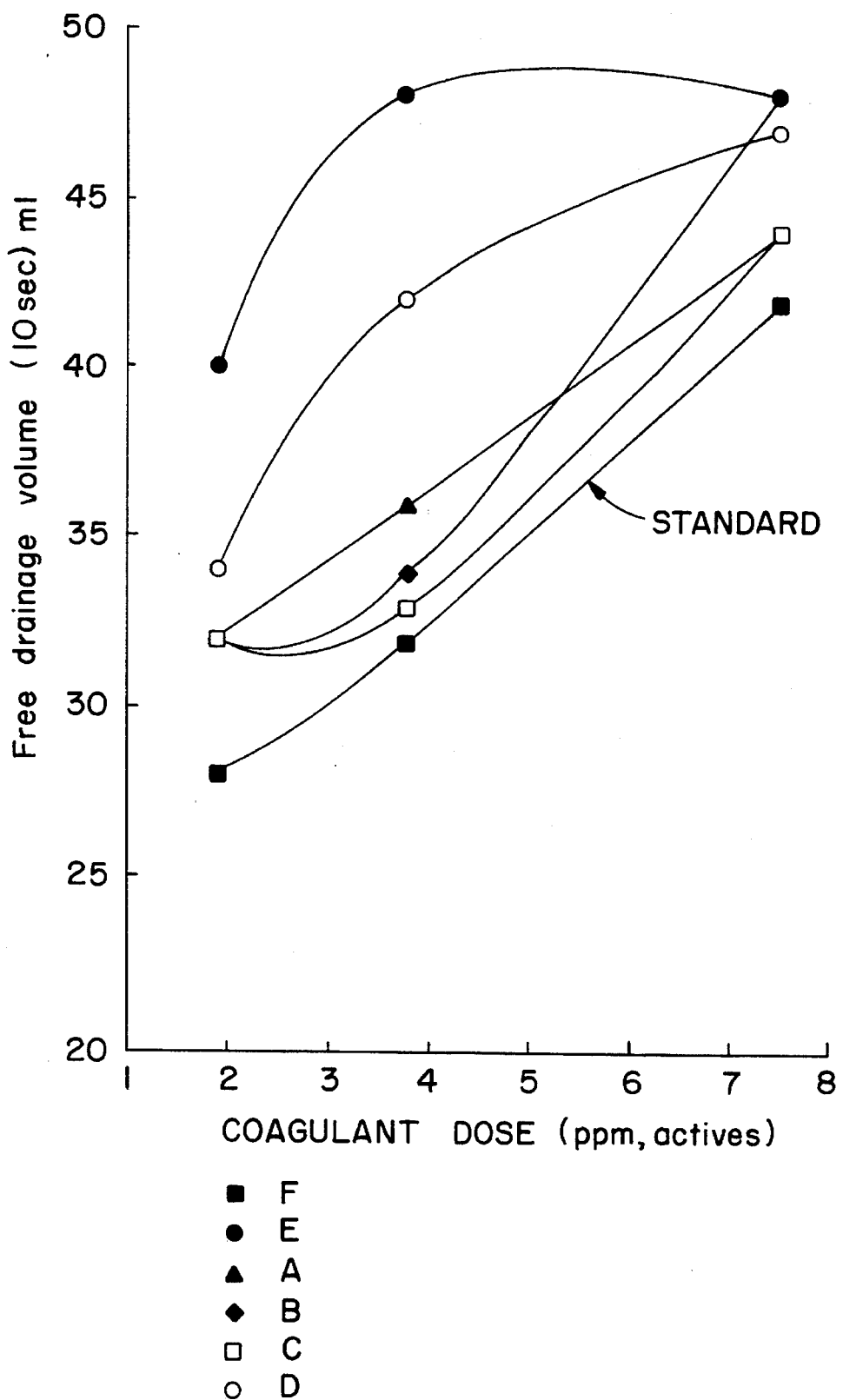

United States Patent [19]

Pillai et al.

[11] Patent Number: 5,518,634
[45] Date of Patent: May 21, 1996

[54] COAGULANT FOR TWIN BELT FILTER PRESSES

[75] Inventors: Krishnan J. Pillai, Naperville; E. Michael Kerr, Aurora, both of Ill.

[73] Assignee: Nalco Chemical Company, Naperville, Ill.

[21] Appl. No.: 448,166

[22] Filed: May 23, 1995

Related U.S. Application Data

[63] Continuation-in-part of Ser. No. 172,777, Dec. 27, 1993, abandoned.

[51] Int. Cl.$^6$ ........................................ C02F 1/56
[52] U.S. Cl. .............................. 210/727; 209/5; 210/734
[58] Field of Search ............................ 209/5; 210/609, 210/705, 725, 727, 728, 732, 733, 734, 735, 778

[56] References Cited

U.S. PATENT DOCUMENTS

| | | | |
|---|---|---|---|
| Re. 32,649 | 4/1988 | Brandt et al. | 604/368 |
| 3,225,490 | 2/1966 | Green | 210/734 |
| 3,284,393 | 11/1966 | Vanderhoff et al. | 260/29.6 |
| 3,624,019 | 11/1971 | Anderson et al. | 260/29.6 H |
| 3,920,599 | 11/1975 | Hurlock et al. | 260/34.2 |
| 3,968,037 | 7/1976 | Morgan et al. | 210/735 |
| 4,077,930 | 3/1978 | Lim et al. | 526/303 |
| 4,342,653 | 8/1982 | Halverson | 210/734 |
| 4,447,344 | 5/1984 | Roe et al. | 252/60 |
| 4,536,186 | 8/1985 | Rey | 44/51 |
| 4,614,593 | 9/1986 | Roark | 210/708 |
| 4,673,511 | 6/1987 | Richardson et al. | 210/734 |
| 4,715,962 | 12/1987 | Bhattacharyya et al. | 210/708 |
| 4,792,406 | 12/1988 | Allenson et al. | 210/734 |
| 4,906,386 | 3/1990 | Vasconcellos et al. | 210/727 |
| 4,950,725 | 8/1990 | Flesher et al. | 526/287 |
| 5,110,883 | 5/1992 | Gartner | 526/84 |
| 5,171,783 | 12/1992 | Gartner | 524/801 |
| 5,183,575 | 2/1993 | Vasconcellos et al. | 210/724 |
| 5,198,528 | 3/1993 | Smith et al. | 528/272 |
| 5,200,482 | 4/1993 | Gartner | 526/295 |
| 5,210,298 | 5/1993 | Shimomura et al. | 562/598 |
| 5,314,420 | 5/1994 | Smith et al. | 210/691 |
| 5,476,522 | 12/1995 | Kerr et al. | 210/734 |

FOREIGN PATENT DOCUMENTS

| | | |
|---|---|---|
| EP103698-A | 3/1984 | European Pat. Off. . |
| EP161763-A | 11/1985 | European Pat. Off. . |
| EP0495312A1 | 7/1992 | European Pat. Off. . |
| 61126114-A | 11/1984 | Japan . |
| WO84/01145 | 3/1984 | WIPO . |

*Primary Examiner*—Peter A. Hruskoci
*Attorney, Agent, or Firm*—Robert A. Miller; James J. Drake

[57] ABSTRACT

A chemically assisted process for dewatering mining waste solids on mechanical separation devices with at least one flocculant and at least one coagulant. It comprises using as the coagulant a diallyldimethyl ammonium chloride copolymer which contains from 3–25 mole % of acrylamide and which has been cross linked with from 0.01 to 0.5 mole % of triallyl amine.

8 Claims, 2 Drawing Sheets

COAGULANT FOR TWIN BELT FILTER PRESSES

This application is a continuation-in-part of patent application Ser. No. 08/172,777, filed Dec. 27, 1993, now abandoned.

FIELD OF THE INVENTION

This invention relates to a method for chemically improving waste solids dewatering on devices employed for the separation of liquids from solids, particularly those solids categorized as waste solids generated in mineral processing operations.

INTRODUCTION

This invention is directed to an improved method for the dewatering of waste solids generated in mineral processing operations on mechanical filter or separation devices. In processes of this type, solids are typically treated to concentrate them, using mechanical means which are assisted with the application of water soluble coagulants and flocculants. Such materials such as thickened coal refuse slurry solids, thickened copper ore refuse slurries, precious metals refuse slurries, sand and clay refuse generated from the mining, crushing and grinding of construction materials, clay slurries, and wastes from the treatment of bauxite must be concentrated and dewatered prior to disposal or other disposition such wastes. Often times these materials contain as little as 0.5% solids to 20% solids. These materials may have undergone initial treatment such as is generally the case in dealing with coal and copper ore refuse slurries to bring the concentration of solids to 20% to 35% by weight.

The normal treatment for these types of concentrated wastes is to mechanically dewater such slurries with the aid of coagulants and flocculants. Often times these concentrated slurries while being subjected to mechanical dewatering are first treated with a flocculant, generally a high molecular weight anionic material, followed by the application of a coagulating amount of a water soluble cationic coagulant material.

One of the most prominent means of dewatering waste mineral solids involves the use of a device called the twin belt press. This press is an example of the varied types of mechanical dewatering devices utilized. The twin belt press is a filtration device that uses a combination of gravity and pressure dewatering. These are four basic operational stages in a twin belt press. (1) Pretreatment of the slurry, (2) Gravity drainage of free water, (free drainage zone) (3) Wedge zone, and (4) High pressure zone (S-rolls).

Good chemical conditioning is the key to successful and consistent performance of the belt press, as it is for other dewatering processes. In the pretreatment stage, the slurry is treated with chemicals which increase the free water and stabilize the slurry so it stays on the belt. As the slurry is fed onto the filter media, the formation of a uniform evenly-distributed slurry is essential to successful operation of the free drainage, wedge, and pressure zones.

The gravity stage allows free drainage of the water to the point where pressure can be applied to the slurry. Failure to remove the free water in the gravity zone will result in a cake that extrudes (squeezes) off the press as pressure is applied. In the wedge zone, the pressure applied to the cake is gradually increased, further stabilizing the slurry in preparation for the high pressure zone. The cake is then wrapped around a series of S-rolls. The radius of each S-roll is progressively smaller, hence greater pressure, causing increased water release and allowing greater compaction of the cake. The tension of the belt also affects the applied pressures in the high pressure zone. Cake discharge is accomplished over a discharge roller assisted by a discharge blade. Failure to sufficiently dewater the slurry at any stage can result in a fluid cake which is expelled off the sides of the belts.

Twin belt filter presses are often used to dewater solids resulting from the processing of mining waste solids which term includes, in some instances, solid separation in the purification of ores. Mining solids from such mining operations as copper ore processing, phosphate rock purification, uranium processing and the like often are dewatered on twin belt filter presses. A particularly important area of mining where twin belt filter presses are used is in the dewatering of coal refuse solids. To improve drainage and reduce high pressure zones it is common practice in the utilization of twin belt filter presses to first treat the solid suspensions prior to filtration on the twin belt filter press with a flocculant followed by a coagulant. This treatment is often used in the treatment of coal refuse slurries prior to their being filtered on a twin belt press. A coagulant capable of improving the operational efficiency of twin belt filter presses, particularly in the dewatering of coal refuse solids, would represent a worthwhile advance in the art.

Although some inorganic materials, principally alum and iron salts, are still used as coagulants, water soluble organic polymers are more commonly used as coagulants. Both naturally occurring and synthetic polymers find use as coagulants and flocculants in the mining industry. The principal natural polymers are starch and guar, both of which are high-molecular weight polymers of simple sugars (i.e., polysaccharides). Starch is a polymer of glucose consisting of a mixture of linear (amylose) and branched (amylopectin) segments.

Synthetic polymers have the advantage that they can be tailored to a specific application. This has resulted in a wide range of commercially available coagulants and flocculants of varying charge, composition and molecular weight. The most widely used synthetic coagulants are polydiallyldimethyl ammonium chloride as described in U.S. Pat. No. 2,926,161 and condensation polymers of dimethylamine and epichlorohydrin such as those described in U.S. Pat. Nos. Re. 28,807 and 28,808. These polymers vary greatly in molecular weight, typically ranging from several thousand to as high as 100,000. Condensation polymers are made in solution form, and are available commercially as aqueous solutions containing 1–20 weight percent polymer. Polydiallyldimethyl ammonium chloride is a vinyl addition polymer, which at the molecular weights used for coagulation has also been made in solution form. Typical commercially available polydiallyldimethyl ammonium chloride is available in aqueous solutions containing 1–20% by weight polymer.

Dry water soluble polymers such as dry polydiallyldimethyl ammonium chloride have also been used to dewater coal refuse slurries on twin belt presses. These polymers have met with some success, but to be successful in twin belt and other mechanical dewatering applications, must be first dissolved in water prior to using. Disadvantages of dry polymer are that it produces dust; if not carefully fed, may produce gelled agglomerates which can foul feeding equipment; and, is difficult to handle in that bags of the material must be moved into proximity of the thickener, it can not be fed from a remote point more convenient to chemical delivery and handling. The polymers of the present invention overcome these deficiencies while providing activities equivalent to or better than those attained using dry polymers.

THE DRAWINGS

Figure 2:
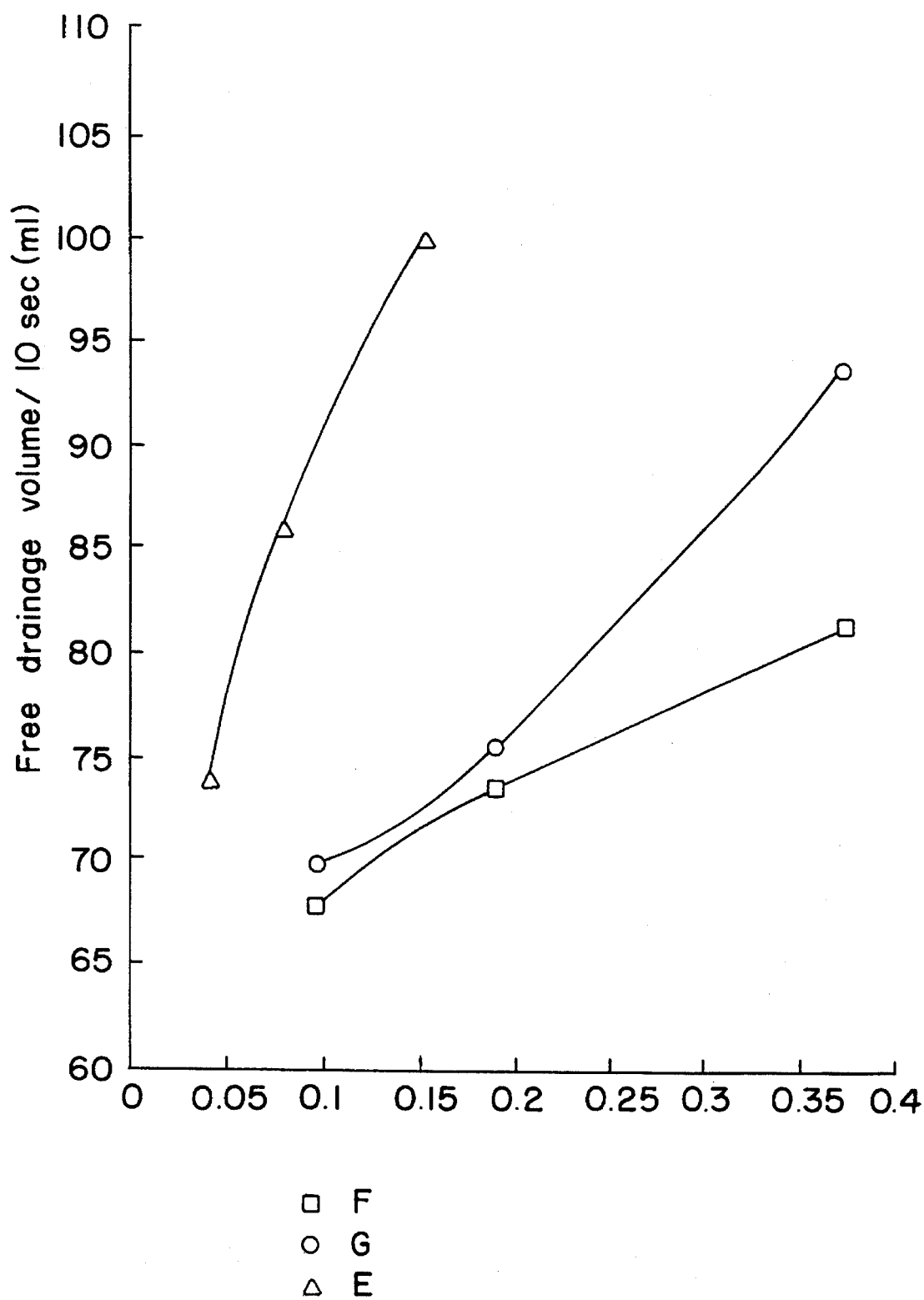

FIGS. 1–2 are graphs showing the advantages achieved in using the coagulants of the invention.

THE INVENTION

In one embodiment, this invention comprises a process for dewatering mining waste underflow solids on mechanical liquid separations devices such as filters with at least one flocculant and at least one coagulant which comprises applying to the underflow solids prior to or simultaneously with the application the underflow solids to the separations device an effective amount of a high molecular weight anionic water soluble flocculant followed by a coagulating amount of diallyldimethyl ammonium chloride copolymer which contains from 3 to 25 mole percent of acrylamide and which is cross linked with from 0.01 to 0.5 mole percent of triallyl amine. Preferably, the polymers contain from 4.5 to 20 mole % of acrylamide and from 0.05 to 0.1 mole % of triallyl amine.

While generally applicable to a variety of waste mineral underflow solids, a particularly preferred embodiment the invention is related to a process for dewatering coal refuse slurry underflow solids on a twin belt filter press with at least one flocculant and at least one coagulant which comprises applying an effective amount of a high molecular weight anionic water soluble flocculant to the underflow solids immediately prior to or simultaneously with the application of said under flow solids to the twin belt filter press and then applying to the solids a coagulating amount of diallyldimethyl ammonium chloride copolymer which contains from 3 to 25 mole percent of acrylamide and which is cross linked with from 0.01 to 0.5 mole percent of triallyl amine.

To perform adequately, the polymers of the invention should have a reduced specific viscosity (RSV) between 0.5 to 5.0 dl/g as measured in 1.0 molar sodium nitrate. The coagulant polymers are preferably employed in the form of a water-in-oil emulsion. They are particularly effective as coagulants for coal refuse solids prior to their being subject to filtration. The polymers used in the practice of the invention are capable of producing excellent results when employed at a dosage, based on actives, of between 5–150 parts per million by weight of the system being treated.

The water-in-oil emulsions of the diallyldimethyl ammonium chloride polymers of this invention contain four basic components. These components and their weight percentages in the emulsions are listed below:

A. Water-soluble diallyldimethyl ammonium chloride polymer:
   1. Generally from 5–60%;
   2. Preferably from 20–40%; and
   3. Most preferably from 25–35%;
B. Water:
   1. Generally from 20–90%;
   2. Preferably from 20–70%; and
   3. Most preferably from 30–55%;
C. Hydrophobic liquid:
   1. Generally from 20–90%;
   2. Preferably from 20–70%;
   3. Most preferably from 25–40%; and,
D. Water-in-oil emulsifying agent:
   1. Generally from 0.1–21%;
   2. Preferably from 1–15%; and
   3. Most preferably from 1.2–10%.

It is also possible to further characterize the water-in-oil emulsions of water-soluble diallyldimethyl ammonium chloride polymers with respect to the aqueous phase of the emulsion. This aqueous phase is generally defined as the sum of the polymer or copolymer present in the emulsion plus the amount of water present in the emulsion. This terminology may be utilized in describing the water-in-oil emulsions which are useful in this invention. Utilizing this terminology, the aqueous phase of the water-in-oil emulsions of this invention generally comprises 25–95% by weight of the emulsion. Preferably, the aqueous phase is between 60–90% by weight of the emulsion, and, most preferably, from 6–85% by weight of the emulsion.

The emulsion also may be characterized in relation to the water/oil ratios. This figure is simply a ratio of the amount of water present in the emulsion divided by the amount of hydrophobic liquid present in the emulsion. Generally, the water-in-oil emulsions of this invention will have a water/oil ratio of from 0.25 to 18. Preferably, the water/oil ratio will range from 0.5–14, and most preferably, from 1.0–2.75.

In certain instances, it is possible to remove substantial quantities of water from the above emulsions while still maintaining the physical and chemical characteristics of the emulsions. Such concentrated, substantially, water-free emulsions, e.g. less than 3% by weight water, are contemplated as being capable of use in the practice of this invention.

A simple method for removing water from emulsions of this type consists of heating said emulsions in the presence of an azeotropic agent for water such as toluene with the temperature being sufficient to form an azeotrope which thereby allows water removal to be achieved. This also allows the emulsion to remain in the form of a water-in-oil emulsion even though it contains very little water.

The Diallydimethyl Ammonium Chloride Polymers

The polymers contained in the water-in-oil emulsions this invention may be homo or copolymers of diallyldimethyl ammonium chloride. In making these polymers, diallyldimethyl ammonium chloride may be polymerized by itself in water-in-oil emulsion form, or may be copolymerized with acrylamide, methacrylamide, or other cationically charged vinyl addition monomers. In the practice of this invention, we have found it particularly useful if the diallyldimethyl ammonium chloride is polymerized with a small amount of a difunctional crosslinking agent.

Among the crosslinking agents which may be used include triallyl amine, methylene-bisacrylamide, tetrallyl ammonium chloride, and methyltriallylammonium chloride, divinyl benzene, diallyl phthalate, poly allyl ethers of polyhydroxyl compounds, e.g., poly allyl sucrose, diallyl sorbitol, poly and other polyolefinic unsaturated compounds known to those skilled in the art of radical polymerization that normally, in systems other than inverse emulsion, lead to the formation of three dimensional networks when used in high proportions. Other crosslinking agents which will be readily apparent to those skilled in the art of vinyl polymerization chemistry not mentioned above may also be used, providing that the resultant polymer is only lightly crosslinked and remains water soluble.

The polymers of this invention generally contain from 99.9 to 70 mole percent diallyldimethyl ammonium chloride, from 0.1 to 30 mole percent acrylamide or methacrylamide and from 0.001 to 0.9 mole percent of a vinyl crosslinking agent. Preferably, the polymers of this invention contain form 99.9 to 80 mole percent diallyldimethyl ammonium chloride, from 0.5–20 mole percent acrylamide or methacrylamide and from 0.001 to 0.7 mole percent of vinyl crosslinking agent, preferably triallyl amine. Most preferably, the polymers of this invention contain from 90–99.9 mole percent diallyldimethyl ammonium chloride, from 1.0–10 mole percent acrylamide and from 0.001–0.5 mole percent triallyl amine. The preferred polymer for use in this invention contains 95.0 mole percent diallyldimethyl ammonium chloride, 4.95 mole percent acrylamide, and 0.05 mole percent triallylamine.

The diallyldimethyl ammonium chloride polymers of this invention have intrinsic viscosities in 1M $NaNO_2$ of from 0.8 to 4.2 and preferably from 1.2 to 2.4. This corresponds to molecular weights of from 100,00 to 500,000 amu.

The molecular weight of the diallyldimethyl ammonium chloride polymers which are the subject of this invention is generally considerably higher than the water soluble polydiallyldimethyl ammonium chloride materials which are available as solution polymers and which have heretofore been employed as coagulants in the treatment of coal slurry refuse streams.

The Hydrophobic Liquids

The hydrophobic liquids or oils used in preparing these emulsions may be selected from a large group of organic liquids which include liquid hydrocarbons and substituted liquid hydrocarbons.

A preferred group of organic liquids that can be utilized in the practice of this invention are paraffinic hydrocarbon oils. Examples of these types of materials include a branch-chain isoparaffinic solvent sold by Exxon Chemicals under the tradename "Escaid 110". Typical specifications of this material are set forth below in Table 1.

TABLE 1

| | |
|---|---|
| Specific Gravity 60°/60° F. | 0.780–0.806 |
| Color, Saybolt | +30 min. |
| Appearance Visual | Bright and Clear |
| Aniline Point, °F., ASTM D-11 | 160 min. |
| Distillation, °F., ASTM D-86 | |
| IBP | 365 min. |
| FBP | 505 |
| Flash Point, °F., TCC | 140 min. |
| Sulfur, ppm Microcoulometer | 15 max. |

While paraffinic oils are the preferred materials for use in preparing the water-in-oil emulsions of this invention, other organic liquids can be utilized Thus, mineral oils, kerosene, naphthas, and in certain instances, petroleum may be used. While useful in this invention, solvents such as benzene, xylene, toluene and other water immiscible hydrocarbons having low flash points or toxic properties are generally avoided due to problems associated with their handling or use.

As stated earlier, the polymers of this invention are in the form of water-in-oil emulsions. Water-in-oil emulsions of water soluble vinyl addition polymers are more fully described in U.S. Pat. No. 3,284,393, Vanderhoff, and U.S. Pat. No. 3,624,019, Anderson et al., both of which are hereinafter incorporated by reference. The diallyldimethyl ammonium chloride polymers of the present invention are preferably prepared by mixing the oil phase and water phase in the presence of a water-in-oil emulsifying agent, and subjecting the resultant emulsion to free radical polymerization conditions.

Any conventional water-in-oil emulsifying agent can be used such as sorbitan monostearate, sorbitan monooleate, and the so called low HLB materials which are all documented in the literature and are summarized in the Atlas HLB Surfactant selector. Although the mentioned emulsifiers are used in producing good water-in-oil emulsions, other surfactants may be used so long as they are capable of producing these emulsions. The water-in-oil emulsifying agents are present in the emulsion in amounts ranging from between 0.1 and 21 percent by weight of the emulsion. The preferred range is between 1.0 and 15.0% of the emulsion. The most preferred range is between 1.2 and 10% by weight of the emulsion.

The polymers contemplated for use in this invention may be synthesized in emulsion form as described in Vanderhoff et al., U.S. Pat. No. 3,284,393 which is hereby incorporated by reference. The free radical inverse emulsion polymerization technique set forth in Vanderhoff is generally followed in preparing polymeric latexes used in this invention. The water-in-oil emulsions used in the practice of this invention exhibit the unique ability of allowing the water soluble polymer contained therein to rapidly dissolve into an aqueous solution. The polymer containing emulsion releases the polymer in water in the presence of a surfactant in a very short period of time. This technique is described in Anderson et al., U.S. Pat. Nos. 3,624,019 and 3,734,873. Alternatively, the polymers may be precipitated from the emulsions using a polar organic liquid such as acetone.

When a surfactant is used to invert the emulsion, it may be added to the emulsion itself, or may be added to the aqueous system into which the emulsion is to be added. Surfactant used to invert the emulsions are generally water soluble, high HLB value surfactant such as ethoxylated nonyl phenols, ethoxylated primary alcohols, and ethoxylated secondary alcohols.

In a preferred embodiment of this invention, the hydrophilic/lipophilic balance (HLB) of the surfactant used to prepare the water-in-oil emulsion of the diallyldimethyl ammonium chloride polymer is adjusted so as to allow the polymer contained therein to rapidly dissolve upon contact with the refuse on the twin belt press.

The polymers of the instant invention are prepared by mixing together the contents of the aqueous phase and oil phase, purging the system of oxygen with an inert gas, and initiating the polymerization with a free radical catalyst. Those familiar with the art of vinyl polymerization will readily appreciate the method of forming the polymers of the instant invention. Suitable examples of free radical polymerization of water soluble monomers in water-in-oil emulsion form are found in many issued patents. Generally, during the polymerization procedure usually followed in the course of this invention, the reaction temperature of the diallyldimethyl ammonium chloride polymer is controlled at 30° C. to 70° C. for a period time sufficient to allow the polymerization to take place. After the exothermic portion of the polymerization, the reaction is heated to 30°–90° C. for a period of time to remove residual monomers, and to make sure that the vinyl monomers have polymerized. The water-in-oil emulsion is then recovered. If desired, oil-in-water surfactant useful to invert the emulsion may be added, or, the oil-in-water surfactant may be added to the coal refuse slurry prior to the addition of the water-in-oil emulsion so as to cause the inversion of the water-in-oil emulsion to an oil-in-water emulsion to take place in the coal refuse slurry.

In order to evaluate the process of this invention a diallyldimethyl ammonium chloride polymer was prepared. The polymerization was carried out in a three liter resin flask equipped with nitrogen sparge tube, thermocouple well, condenser, monomer addition funnel, and stirrer capable of regulation at 1000 r.p.m. Temperature was controlled by using heating tape and an external water sparge. The emulsion was prehomogenized using a commercially available homogenizer for two minutes at high speed. Addition of water soluble initiator (post-addition) was made with a syringe pump. pH of the monomer solution was adjusted to 3.5 prior to polymerization.

| Oil Phase: (in percentages by weight of total latex) | 30.5% |
|---|---|
| Escaid 110 Paraffin Solvent | 27 |
| Span 80 (Sorbitan monooleate available from ICI Americas Inc.) | 1 |
| Alkaterge T (a 4.0 HLB tall oil-oxzaoline derivative available from Alkaril, Inc.) | 1 |
| Lonzest STS20 (a POE-20 sorbitan tristearate available from Lonza, Inc.) | 0.5 |
| Hypermer IL2296 (a proprietary blend of surfactants available fromICI Americas, Inc.) | 1 |
| Water Phase: | |
| Diallyldimethyl ammonium chloride (95 mole %) | |
| Acrylamide (4.95 mole %) | |
| Triallyl amine (0.05 mole %) | |
| TOTAL MONOMER PERCENT | 40 |
| Water | 29.4 |
| Catalyst - Vazo ® 64/Vazo ® 52 initiator | 0.05/0.05 |
| Post treatment - ammonium persulfate | 0.3 weight percent |

The resultant water-in-oil emulsion of diallyldimethyl ammonium chloride polymer was determined to have a reduced specific viscosity of 2.24 dl/g and an intrinsic viscosity of 1.84 dl/g. The polymer was found to be 94.9% converted by liquid chromatography, and the water-in-oil emulsion was found to contain 37.98% by weight polymer. This material is hereinafter described as Sample E. Additional materials were prepared having different monomer ratios using the above described procedure. These materials along with Sample E are detailed in Table 2 below.

TABLE 2

| Example | Mole % DADMAC | Mole % AcAm | Mole % TAA |
|---|---|---|---|
| A | 80 | 19.9 | 0.1 |
| B | 85 | 14.9 | 0.1 |
| C | 75 | 24.95 | 0.05 |
| D | 90 | 9.9 | 0.1 |
| E | 95 | 4.95 | 0.05 |

The polymers of this invention are particularly well adapted to be applied to coal refuse slurries on twin belt presses. Coal refuse slurries contain minor amounts of coal and larger amounts of clay and other inorganics that result from the cleaning of coal at preparation plants. Typically, these plants separate the coal refuse from a much more dilute slurry by the application of a cationic polymer coagulant followed by the application of a high molecular weight anionic polymer to form a floc. The coal refuse slurry is typically then discharged from a clarifier underflow. It is this underflow generally containing 15 to 35% solids that must be effectively dewatered prior to landfilling or other disposal methods. This slurry, now substantially more concentrated than the original coal refuse stream that left the treatment plant, but much too dilute and fluid to dispose of in a landfill or by other means, is typically mixed with a high molecular weight anionic water soluble polymer flocculant to flocculate the solids.

Typical water soluble anionic flocculant polymers of this class are polyacrylic acid and its alkali metal salts as well as copolymers of acrylic acid or its alkali metal salts with acrylamide or methacrylamide. Other anionic flocculant polymers than those described above may also be utilized in this process. Polymers of this type are well-known, and are available from variety of commercial sources. Generally, these polymers will have molecular weights in excess of 1 million, and preferably, in excess of 10 million. The amount of high molecular weight anionic water soluble flocculant polymer that is added to the coal refuse slurry may range from as little as 0.001 pounds of actives per ton of solids to as high as 4.5 pounds of polymer actives per ton of solids treated. Preferably, from 0.15 pounds of polymer to 1.50 pounds of polymer are employed per ton of solids treated, and most preferably from 0.25 pounds of polymer to 1.15 pounds per ton of solids.

After mixing with the anionic flocculant, the mixture is contacted with a cationic coagulant polymer. It is this coagulant polymer that is the subject of this invention. Generally, from 0.001 to 4.5 pounds of cationic coagulant polymer actives are added per ton of solids. Preferably, from 0.04 to 1.25 pounds of polymer actives are added per ton of solids. Most preferably, from 0.1 to 1.2 pounds of cationic coagulant polymer actives are added per ton of solids in the coal slurry. Cationic coagulant polymer should be added to in effect neutralize the anionic charge present in the underflow treated with the anionic flocculant. Excess cationic coagulant beyond that required for charge neutralization should not be added.

After this addition, the slurry is deposited upon the moving belt of a twin belt press, and through the mechanical action of the press and the physical and chemical action the polymers, the coal slurry is dewatered. Generally, to be satisfactory, the resultant filter cake should contain as little moisture as possible. Generally, filter cakes having been treated with an anionic flocculant followed by the polymer of this invention contain from 15 to 40 percent by weight water. Most preferably, the filter cakes after treatment with an anionic flocculant and the polymer of this invention contain from 25 to 30 percent by weight water.

The anionic flocculant and cationic polymer of this invention are added to the clarifier underflow and mixed. Mixing may be accomplished by turbulent flow. In most commercial practices, the anionic polymer is added as a dilute solution to the coal refuse thickener underflow prior to a pump. The induced turbulence adequately mixes the polymer with the underflow. Occasionally, too much shear is provided by the pump with the result that the molecular weight of the anionic flocculant is degraded. In these case, the anionic flocculant may be added after the pump. The cationic coagulant of this invention is added to the underflow immediately prior to the underflow being deposited upon the twin belt press. It is preferable to add the cationic coagulant as a dilute solution at the twin belt press manifold, or immediately prior to the manifold. It is important that both the first added anionic flocculant and the second added polymer of this invention be as evenly distributed over the coal refuse slurry underflow as possible to obtain optimum results.

In order to demonstrate the efficacy of the polymers of this invention, the following testing was conducted.

Gravity Dewatering Test Procedure

The gravity dewatering test is a tool for reliably screening products and evaluating application variables for twin belt press dewatering. Results obtained in testing can generally be directly translated to the plant process. The following procedure outlines suggested steps in performing a thorough test program.

1. An apparatus consisting of a 500 ml graduated cylinder, powder funnel, and plastic collar which retains a filter cloth on the top of the powder funnel, all supported by a ring stand and appropriate clamps was constructed. The filter cloth used was a nylon Filterlink® 400 mesh round orifice cloth of a type similar to that used in commercial practice.

2. Obtain 5–10 gallons of untreated dewatering feed (clarifier underflow) and set up the test apparatus.

3. Using a spatula, hand mix the slurry to uniformly disperse any coarse solids present. Immediately sample and transfer 200 ml of undertow slurry into a 500 ml graduated cylinder. Re-mix the underflow slurry prior to filling each new cylinder.

4. Measure in a syringe and set aside the desired amount of coagulant as 1% solution. Measure and add the desired amount of anionic polymer flocculant stock solution to a 50 or 100 ml graduated cylinder, dilute to a total of 20 ml (or 10% of the underflow slurry volume) with process water, mix thoroughly, and set aside.

5. Invert the 500 ml graduate cylinder containing the 200 ml of undertow slurry 3–4 times to thoroughly disperse the solids, then immediately add the pre-measured flocculant solution from step 3, re-stopper the cylinder and invert 4 times. Duplicate the mixing motion as closely as possible in each test.

6. Immediately add the pre-measured coagulant solution, re-stopper and invert 2 additional times.

7. Pour the conditioned slurry into the plastic collar section of the test apparatus and immediately start a stopwatch. Record the drainage volumes collected every 10 seconds for a time period greater than actual commercial plant process time for gravity drainage. After removing the plastic collar, note the dewatered cake stability and thickness. If the thickness is significantly different from plant conditions, adjust the initial test slurry volume in step 2 accordingly.

8. Repeat testing, adjusting products and dosages to obtain maximum free drainage volumes in the process time allowed. Plot out both volume vs. time and the 10 second volume vs. dosage data as testing proceeds to double-check results. Reasonable data should plot along a relatively smooth curve. Scattered data points indicate either errors or possible sample deterioration.

Test Results

Using this test method, several DADMAC crosslinked polymers were evaluated and compared against conventional DADMAC polymers. The polymers were in the form of water-in-oil emulsions. The compositions of these polymers is set forth below in Table 3. All polymers had reduced specific viscosities between 0.5–5 dl/g. Prior to evaluating the materials this invention, 3.0 weight percent of Tergitol 15-S-12, believed to be a high HLB surfactant comprising a secondary alcohol ethoxylated with 12 moles of ethylene oxide was added to each latex sample in order to insure that the latexes would rapidly invert from water-in-oil emulsions to oil-in-water emulsions and consequently rapidly release the water soluble polymer contained therein into the aqueous slurry.

TABLE 3

| Polymer | Mole % (DADMAC/AcAm/TAA) |
|---|---|
| A | 80/19.9/0.1 |
| B | 85/14.9/0.1 |
| C | 75/24.95/0.05 |
| D | 90/9.9/0.1 |
| E | 95/4.95/0.05 |
| F | 100/0/0 Dry Commercial cationic polydiallyldimethyl ammonium chloride, sold by Nalco Chemical Company as Nalco ® 9850 |
| G | Commercial Polymer Similar to Polymer F |

The results of testing on two different commercial coal refuse slurries are presented in FIGS. 1 and 2. In all the tests, the flocculant used was Nalco® 9810 a 40% by weight sodium acrylate-acrylamide copolymer in water-in-oil emulsion from having a molecular weight greater than 10,000,000 available from the Nalco Chemical Company.

While we have described our invention with particular reference to the dewatering of coal refuse slurries on twin belt filter presses, it will be apparent to those skilled in the art that this invention will find applicability in the dewatering of other types of mining wastes on both twin belt filters and other devices which are commonly used for the treatment of mining wastes.

Among the mining waste materials on which this invention is expected to perform are copper ore refuse slurries obtained from the leaching or flotation of finely milled copper containing ore. After thickening, this refuse can be filtered using a belt press, disc filter or the like to obtain a waste material filter cake having a lower moisture content for subsequent disposition. The concentrate from flotation may also be filtered using one of the above mentioned filter processes. Likewise, refuse resulting from the leaching or flotation of finely milled gold or silver containing ores may be treated in accordance with this invention. After thickening, the refuse can be filtered using a belt press filter, disc filter or the like to obtain a lower moisture filter cake for disposition. Slurries formed in the Merrill Crowe process for precious metals extraction can be similarly treated to reduce moisture prior to smelting.

Other mineral wastes to which this invention finds applicability include the dewatering of sand and clay particles generated during crushing and grinding of gravel for construction materials, clay slurries including kaolin which can be concentrated to higher solids levels using drum, string and other filtration techniques, bauxite, including the dewatering of both alumina products using sand filters, and the dewatering of "red mud" tailings using other filtration techniques. The application of this invention is thus preferably carried out on waste mineral solids which have been previously thickened, and such material can be referred to as the underflow from a clarifier or other primary solids separations step.

While generally applicable to waste solids, the invention is also applicable to the recovery of desired material such as in the manufacture of kaolin or other clays or in the recovery and dewatering of precious metal ores.

As stated above, this invention finds particular utility when used to dewater mineral wastes on twin belt filter presses. The invention will also find utility in the treatment of mining wastes on disc, gravity, vacuum, rotary table (Bird), sand, drum, string, plate and frame press filters.

Having thus described the surprising effect of the polymers of the instant invention in the dewatering of mineral slurries on twin belt filter presses, we claim the following as our invention.

We claim:

1. A process for dewatering waste solids generated in mineral processing operations on a filter with at least one flocculant and at least one coagulant which comprises applying to the waste solids prior to or simultaneously with the application of the waste solids to the filter an effective amount of an anionic water soluble flocculant having a molecular weight in excess of one million to flocculate the solids followed by a coagulating amount of a diallyldimethyl ammonium chloride copolymer in the form of a water-in-oil emulsion which contains from 3 to 25 mole percent of acrylamide and which is crosslinked with from 0.01 to 0.5 mole percent of triallyl amine to coagulate the flocculated solids and then dewatering the waste solids on the filter.

2. The process of claim 1 where the waste solids are a coal refuse underflow slurry.

3. The process of claim 1 wherein the waste solids is a copper ore refuse underflow slurry.

4. The process of claim 1 where the mole % of acrylamide is 4.5–20 and the mole % of triallyl amine is 0.05–0.1.

5. The process of claim 2 where the mole % of acrylamide is 4.5–20 and the mole % of triallyl amine is 0.05–0.1.

6. The process of claim 1 wherein the filter is a twin belt filter press.

7. A process for dewatering coal refuse slurry solids on a twin belt filter press with at least one flocculant and at least one coagulant which comprises applying an effective amount of an anionic water soluble flocculant having a molecular weight in excess of one million to the slurry solids immediately prior to or simultaneously with the application of said slurry solids to the twin belt filter press to flocculate the solids and then applying to the solids a coagulating amount of a diallyldimethyl ammonium chloride copolymer in the form of a water-in-oil emulsion which contains from 3 to 25 mole percent of acrylamide and which is crosslinked with from 0.01 to 0.5 mole percent of triallyl amine to coagulate the flocculated solids and then dewatering the coal refuse slurry solids on the twin belt filter press.

8. The process of claim 7 where the mole % of acrylamide is 4.5–20 and mole % of triallyl amine is 0.05–0.1.

* * * * *